Patented Nov. 30, 1926.

1,608,643

UNITED STATES PATENT OFFICE.

JOHN C. WOODRUFF AND GROVER BLOOMFIELD, OF TERRE HAUTE, INDIANA, ASSIGNORS TO COMMERCIAL SOLVENTS CORPORATION, OF TERRE HAUTE, INDIANA, A CORPORATION OF MARYLAND.

CATALYST FOR SYNTHETIC METHANOL PRODUCTION.

No Drawing. Application filed May 26, 1926. Serial No. 111,883.

Our invention relates to the production of methanol by the high pressure catalytic combination of oxides of carbon with hydrogen, and pertains more directly to the preparation and employment of improved catalysts in the process.

Methanol may be produced by combining oxides of carbon with hydrogen in the presence of a suitable catalyst at elevated temperature and pressure. Carbon monoxide, carbon dioxide, and mixtures of the two oxides may be employed, these substances reacting with hydrogen according to the following reactions:—

Carbon monoxide—$CO + 2H_2 \rightleftarrows CH_3OH$
Carbon dioxide—$CO_2 + 3H_2 \rightleftarrows CH_3OH + H_2O$ It is observed that when carbon dioxide is the oxide employed, one molecule of water is formed for every molecule of methanol produced. On the other hand when pure carbon monoxide is used, theoretically there is nothing produced by the reaction but methanol. Actually in practice pure carbon monoxide and pure carbon dioxide are both difficult to obtain economically, so that the methanol synthesis is carried out by reacting a mixture of carbon monoxide and carbon dioxide with hydrogen.

In addition to the reactions producing methanol there are, in the methanol synthesis, undesirable side-reactions which cut down the yield of the desired product. The principal side reaction which may occur is the formation of methane which is illustrated below:

$$CO + 3H_2 \rightleftarrows CH_4 + H_2O$$
$$CO_2 + 4H_2 \rightleftarrows CH_4 + 2H_2O$$

In addition to the methane side-reaction there are other side-reactions which sometimes occur in which there are produced esters, aldehydes, organic acids, ketones, and hydrocarbons other than methane; these reactions occurring as the result of the polymerization or condensation of methanol or its decomposition products.

When a gas mixture comprising carbon oxides mixed with an excess of hydrogen over the amount theoretically required to produce methanol is passed over a catalytic substance consisting of metallic oxides at a pressure above 100 atmospheres and at a temperature above 250° C. there is nearly always produced some reaction between the gaseous components. The extent of this reaction depends to some degree on space velocity, temperature, and pressure, but the fact remains that under the conditions outlined, carbon oxides and hydrogen react to some extent in all cases.

The substances formed by such a process depend, both as to identity and as to amount, almost entirely on the nature and activity of the catalytic substance present. The methanol catalysts mentioned in prior patents and literature are combinations of metals or their oxides which substances normally exert a hydrogenating catalytic effect on gas reactions.

Without exception the literature on the high pressure catalytic process for synthesizing methanol definitely states that the presence of iron or any of its compounds in a catalyst destroys or poisons the catalysts and inhibits methanol formation. While iron is an excellent hydrogenating catalyst for many reactions, in some forms it reacts with carbon monoxide, and with mixtures of hydrogen and the carbon oxides (i. e. carbon monoxide and/or carbon dioxide) used in the methanol reaction, forming a volatile carbonyl compound and inhibiting the methanol reaction. The normal effect of the presence of iron in a methanol catalyst is to cause the reaction of hydrogen and carbon oxides to produce only methane.

We have now discovered a method of employing iron in a methanol catalyst whereby the desirable hydrogenating catalytic effect of the iron is obtained and the tendency to methane formation is inhibited. In preparing our improved catalyst we employ a mixture of zinc oxide and ferric hydroxide. Zinc oxide—per se—has no catalytic effect on the methanol reaction, while ferric hydroxide—per se—has a positive inhibiting effect. Nevertheless, when these two ingredients are properly compounded a desirable methanol catalyst is produced.

We have discovered that when ferric hydroxide obtained by precipitation of iron from a ferric salt in aqueous solution is incorporated with zinc oxide and the mass is dried and broken up into granules the resultant material produces an active catalyst for the synthetic methanol reaction. While we are certain that in the presence of the hydrogen and carbon oxide gas mixtures used for synthesizing methanol the ferric hydroxide is subsequently reduced to iron oxide and possibly in part to iron—per se— the exact structure of the resultant catalyst is not known to us.

The amount of ferric hydroxide may vary from 3% to 25% of the weight of zinc oxide, though we prefer to use about 10%. The zinc oxide may be incorporated with ferric hydroxide in any convenient manner as is indicated in the appended examples.

Example I 313 grams of ferric nitrate

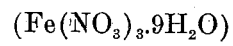

is dissolved in 25 liters of water which is then heated to 95° C. To the hot solution is added 750 grams of zinc oxide with stirring. 190 cubic centimeters of 12.38 normal ammonium hydroxide is added to precipitate the iron to the hydroxide form. The mixture is allowed to stand, the supernatant liquid siphoned off, and the mass is filtered and washed until there is no test for nitrates in the filtrate.

The mass is then completely dried and broken up into granules, whereupon it is ready for use.

It will be observed that the final composition of this catalyst after precipitating the iron and drying the mass is approximately 750 grams zinc oxide and 82 grams of ferric hydroxide.

Example II 350 grams of ferric nitrate is dissolved in 5 liters of water and sufficient ammonium hydroxide is added to precipitate all of the iron as ferric hydroxide. The resultant flocculent mass is thoroughly washed with water and after decanting the excess water, 850 grams of zinc oxide is thoroughly mixed therewith. The mixture is then dried and broken up into granules.

Example III

In place of the ferric nitrate mentioned in Examples I and II an equivalent quantity of another soluble ferric salt may be employed.

When a mixture of 90% hydrogen gas with 10% oxides of carbon, comprising about 7% carbon dioxide and 3% carbon monoxide is passed over 1000 cubic centimeters of catalyst granules thus prepared at a pressure of 2000 pounds at a temperature of about 350°–450° C., and at a space velocity of about 75,000 there will be produced, hourly, about 1.2 liters of condensate containing about 55% of methanol, the remainder of the condensate being substantially pure water. Increase of pressure and increase of space velocity over the figures given in the example increase the total amount of condensate per hour whereas an increase in the percentage of carbon monoxide produces an increase in the percentage of methanol in the condensate.

If pure carbon monoxide is employed as the carbon oxide the percentage may be advantageously increased to 20%, the hydrogen being correspondingly diminished.

Now having described our invention we claim the following as new and novel.

1. A methanol catalyst comprising zinc oxide and ferric hydroxide.

2. A methanol catalyst comprising 97–75% zinc oxide and 3–25% ferric hydroxide.

3. A methanol catalyst comprising zinc oxide and ferric hydroxide, the ferric hydroxide being formed by precipitation in aqueous solution from a soluble ferric salt.

4. A methanol catalyst comprising 97–75% zinc oxide and 3–25% ferric hydroxide, the ferric hydroxide being formed by precipitation in aqueous solution from a soluble ferric salt.

5. A methanol catalyst comprising 750 grams of zinc oxide and 82 grams of ferric hydroxide, the ferric hydroxide being formed by precipitation in aqueous solution from a soluble ferric salt.

6. A process for the preparation of a methanol catalyst which comprises precipitating ferric hydroxide from an aqueous solution of a ferric salt on zinc oxide.

7. A process for the preparation of a methanol catalyst which comprises precipitating from 3–25% of ferric hydroxide from an aqueous solution of a ferric salt on 97–75% of zinc oxide.

8. A process for the preparation of a methanol catalyst which comprises mixing zinc oxide with an aqueous solution of a ferric salt, precipitating ferric hydroxide by adding ammonium hydroxide, filtering, washing, and drying the resultant mass.

9. A process for the preparation of a methanol catalyst which comprises dissolving 313 grams of ferric nitrate in 25 liters of water, adding 750 grams of zinc oxide, precipitating the iron as ferric hydroxide by adding ammonium hydroxide, and recovering the resultant mass in dry form.

10. A process for the production of synthetic methanol which comprises passing a mixture of hydrogen and carbon oxides at a pressure in excess of 50 atmospheres and at a temperature of 350–450° C. over a catalyst initially containing zinc oxide and ferric hydroxide, cooling the reacted gases, and recovering the resultant methanol.

11. A process for the production of synthetic methanol which comprises passing a mixture of hydrogen and carbon oxides at a pressure in excess of 50 atmospheres and at a temperature of 350-450° C. over a catalyst initially containing 97-75% zinc oxide and 3-25% ferric hydroxide, cooling the resultant gases, and recovering the resultant methanol.

In testimony whereof we affix our signatures.

JOHN C. WOODRUFF.
GROVER BLOOMFIELD.